United States Patent
Yamada et al.

[11] Patent Number: 6,139,774
[45] Date of Patent: Oct. 31, 2000

[54] FLUORESCENT SUBSTANCE

[75] Inventors: Masayuki Yamada, Toride; Yoji Takeuchi, Aichi-ken, both of Japan

[73] Assignee: Hitachi Maxell, Ltd., Osaka, Japan

[21] Appl. No.: 08/943,269

[22] Filed: Oct. 3, 1997

[30] Foreign Application Priority Data

Oct. 3, 1996 [JP] Japan ................................. 8-281841

[51] Int. Cl.$^7$ ............................. C07K 11/55; C07K 11/67
[52] U.S. Cl. ............................. 252/301.4 F; 252/301.4 R
[58] Field of Search ....................... 282/301.4 R, 301.4 F

[56] References Cited

U.S. PATENT DOCUMENTS 5,650,094  7/1997  Royce et al. .................. 252/301.4 F

FOREIGN PATENT DOCUMENTS 5-74572   3/1993  Japan .
815145A   6/1996  Japan .

OTHER PUBLICATIONS

Chemical Abstract Citation 89:188284, "Kravets et al, Synthesis and Spectral–luminescent Properties of Calcium Zirconate Doped with Europium (3+), Dysprosium (3+), Neodymium (3+) and Terbium (3+) Ions", 1978 no month.

*Primary Examiner*—C. Melissa Koslow
*Attorney, Agent, or Firm*—Birch, Stewart, Kolasch & Birch, LLP

[57] ABSTRACT

The present invention provides an infrared fluorescent substance comprising a component represented by general formula $AQO_3$:X (A is at least one element selected from the group consisting of Ca, Sr and Ba, Q is Ti or Zr, and X is at least one element selected from the group consisting of Nd and Yb), and optionally comprising component Y (Al, Ga or In) and/or component Z (Sc, Y, Gd, Bi, Lu or La). Said fluorescent substance is free from the faults of phosphate type fluorescent substances, namely high price and deep blue color, and is low in price, light in blue color, and high in durability.

14 Claims, 8 Drawing Sheets

EMISSION SPECTRUM OF FLUORESCENT SUBSTANCE OF EXAMPLE 21

FIG. 3

EMISSION SPECTRUM OF FLUORESCENT SUBSTANCE OF EXAMPLE 4

X RAY DIFFRACTION PATTERN OF EXAMPLE 8

FIG. 8

EMISSION SPECTRUM OF FLUORESCENT SUBSTANCE OF EXAMPLE 21

FLUORESCENT SUBSTANCE

BACKGROUND OF THE INVENTION

The present invention relates to a fluorescent substance for use in Stellus type bar code. More particularly, the invention relates to modification of a parent material structure and formulation of infrared-emitting fluorescent substance having an emission spectrum in the infrared wavelength region, and the formation of fine particles of the fluorescent substance.

Currently, article control by the use of bar codes, is actively adopted in industry, and particularly the circulation industry. Further, bar codes are printed on prepaid cards, passing cards, etc., and are read out by means of an optical reading device such as scanner or the like. Further, a variety of forgery-preventing means are applied to credit cards and the like, and a variety of means for detecting forgery on these cards have been proposed. As one of such means, there has been proposed an optical reading device in which a semiconductor laser is irradiated to a latent image mark or the like printed with a fluorescent substance-containing ink to excite the fluorescent substance and the light emitted from the fluorescent substance is detected as bar code information.

According to this method, a forged or altered card can be discovered with certainty because a fluorescent signal is emitted only when a recorded mark is present. Further, forgery or alteration of the card is quite difficult to practice because the contents of the latent image are unknown to persons other than the true card maker.

Fluorescent materials for Stellus type bar code such as $LiNdYbP_4O_{12}$, $NdYbP_5O_{14}$, $LiNdP_4O_{12}$, $KNd(PO_3)_2$, $NaNd(WO_4)_2$ and the like have been used (Japanese Patent Publication No. 40594/1978).

These fluorescent substances are called stoichio metric fluorescent substances, and the cations in these substances are exclusively composed of rare earth elements such as Nd, Yb, etc. Accordingly, this type of fluorescent substance have a problem that it has a deep blue color due to the presence of Nd.

Further, this type of fluorescent substance has the problem of large particle size which can be 7 $\mu$m or more, so that it has to be pulverized when applied to offset the printing process or ink ribbon, and the pulverization deteriorates crystallinity and formulation of fluorescent substance and much decreases the fluorescence intensity thereof.

Further, since rare earth elements are generally expensive, the use of a large quantity of such rare earth element is one of the causes of the high price of fluorescent substances.

Further, at the present time, the self flux process is adopted for the manufacture of these fluorescent substances, and the adoption of such a process also increases the price of the fluorescent substances. Further, the self flux process is low in product yield, and therefore enhances the price of fluorescent substances. The self flux process is a process of adding the starting phosphate material in a largely excessive amount to rare earth elements and separating the excessive phosphate from fluorescent substance by a treatment using nitric acid after firing.

SUMMARY OF THE INVENTION

Accordingly, it is an object of the present invention to solve the faults of phosphate type fluorescent substances, namely high price, deep blue color and great particle size, and by providing a fluorescent substance having a high intensity of light emission, a low price, a light blue color, a possibility of making fine particles, and a high durability.

The problem mentioned above can be solved by a fluorescent substance represented by the following general formula:

$$ATi(or\ Zr)O_3{:}X$$

wherein X represents at least one element selected from the group consisting of Nd and Yb), which comprises a titanate of at least one element selected from the group consisting of Ca, Sr and Ba, namely $ATiO_3$ wherein A is at least one element selected from the group consisting of Ca, Sr and Ba, or a zirconate of at least one element selected from the group consisting of Ca, Sr and Ba, namely $AZrO_3$ wherein A is at least one element selected from the group consisting of Ca, Sr and Ba, and Nd or Yb as an optically active element, and has a mean particle size of 5 $\mu$m or less and preferably 2 $\mu$m or less.

Further, the problem mentioned above can be solved also by a fluorescent substance comprising at least one element selected from the group consisting of Al, Ga and In, as represented by the following general formula:

$$ATi(or\ Zr)O_3{:}X,Y$$

wherein Y represents at least one element selected from the group consisting of Al, Ga and In.

Further, the problem mentioned above can be solved also by a fluorescent substance comprising at least one element selected from the group consisting of Sc, Y, Gd, Bi, Lu and La as an optically inactive element, as represented by the following general formula:

$$ATiO_3{:}X,Y,Z$$

wherein Z represents at least one element selected from the group consisting of Sc, Y, Gd, Bi, Lu and La.

Further, the problem mentioned above can be solved also by a fluorescent substance represented by the following general formula:

$$AZrTi_2O_7{:}X$$

wherein A represents at least one element selected from the group consisting of Ca, Sr and Ba and X represents at least one element selected from the group consisting of Nd and Yb, or the following general formula:

$$AZrTi_2O_7{:}X,Y$$

wherein Y represents at least one element selected from the group consisting of Al, Ga and In, or the following general formula:

$$AZrTi_2O_7{:}X,Y,Z$$

wherein Z represents at least one element selected from the group consisting of Sc, Y, Gd, Bi, Lu and La.

A fluorescent substance represented by general formula $ATiO_3{:}X$, wherein A represents at least one element selected from the group consisting of Ca, Sr and Ba and X represents Nd or Yb, can be produced by using water-soluble salts (for example, chloride or the like) as the starting compounds, dissolving the water-soluble salts in water to prepare a mixed aqueous solution, and thereafter co-precipitating, said element in the form of hydroxides, oxalates or carbonates together with titanium dioxide, and firing the resulting precipitate.

DETAILED DESCRIPTION OF THE INVENTION

Unlike the so far known stoichiometric fluorescent substances, the fluorescent substance of the invention comprises a titanate or a zirconate and contains at least one element selected from the group consisting of Nd and Yb, and the content of rare earth element in this fluorescent substance is quite low. Accordingly, the fluorescent substance of the present invention is effective for lightening the color and lowering the price. Further, since the self flux process is not adopted, the process of the present invention does not require the use of an excessive flux component, thereof for lowering the price of fluorescent substance.

Next, by adding Al or the like to the titanate type or zirconate type fluorescent substance containing at least one element selected from the group consisting of Nd and Yb, the deviation of composition formula of the fluorescent substance from stoichiometric ratio, brought about by the existence of the at least one element selected from the group consisting of Nd and Yb, can be compensated, so that the addition of Al or the like is effective for lessening the defects in the fluorescent substance and thereby increasing the intensity of light emission.

Further, by adding Sc, Y, Gd, Bi, Lu or La which are all optically inactive elements, the bonding and growth of crystal particles can be controlled, which is effective for making the crystal particles fine.

Further, those fluorescent substances which show a diffraction pattern of rare earth element titanate or rare earth element zirconate in addition to the diffraction pattern of calcium titanate or calcium zirconate in the X ray diffraction measurement also show an intensity of light emission or a mean particle size comparable to those of single phase calcium titanate or calcium zirconate.

Since a titanate type fluorescent substance has a low probability of converting the energy of excitation to heat energy, it has a high luminous efficiency in its nature. On the other hand, since a zirconate type fluorescent substance has a long lattice spacing, it shows only a small decrease in afterglow time and intensity of light emission even if a large amount of rare earth element is added thereto, and therefore it shows a high absorptive power. Since the above-mentioned compositions are excellent in light emission characteristics, they are successfully usable as printed matter or the like.

Ca, Sr and Ba can successfully be use in the form of oxide, halide, carbonate, nitrate and the like. Similarly, Al, Ga, In, Nd, Yb, Sc, Y, Gd, Bi, Lu and La can also be successfully usable in the form of oxide, halide, carbonate, nitrate and the like.

When the fluorescent substance of the present invention is produced by firing, the firing of starting materials may be carried out in the atmospheric air. Although the temperature of firing is not particularly limited, a temperature ranging from 700° C. to 1,500° C. is preferably adopted, in general. The period of time of the firing is also not limited particularly. Generally speaking, a firing time of from several tens of minutes to several hours is preferable.

According to the novel process of the present invention for producing Nd- or Yb-containing calcium titanate fluorescent substance, the homogenization of starting materials can be achieved uniformly even in the delicate regions, which is effective for decreasing the width of particle size distribution of fluorescent substance, uniformalization of composition between particles, and improvement of crystallinity. Further, since the quantity of flux can be decreased, the formation of crystal defects brought about by contamination of fluorescent substance by flux component can effectively be prevented, and the price can effectively be lowered. Further, according to the process of the present invention, even if the element such as Sc, Y, Gd, Bi, Lu or La is not added, there can be obtained a fluorescent substance of which mean particle size is so small as comparable to or smaller than that of the fluorescent substance obtained by adding the above-mentioned elements.

DESCRIPTION OF THE PREFERRED EMBODIMENT

Next, the fluorescent substance of the present invention is exemplified by referring to examples.

EXAMPLE 1

The following starting materials:

| | |
|---|---|
| $Nd_2O_3$ | 76.55 g |
| $Yb_2O_3$ | 167.00 g |
| $CaCO_3$ | 520.00 g |
| $TiO_2$ | 519.00 g |
| LiF | 16.86 g | were thoroughly mixed together, charged into an alumina crucible and then fired at 1,200° C. for 2 hours in the atmospheric air. After firing, the mixture was washed with 1N hydrochloric acid and then with water, and dried. Thus, a particulate material having a mean particle size of about 1 μm was obtained. X ray diffractiometry gave a diffraction pattern of $Yb_2Ti_2O_7$ in addition to that of $CaTiO_3$.

EXAMPLE 2

A fluorescent substance was prepared by repeating Example 1, except that the starting materials were altered to the following ones:

| | |
|---|---|
| $Nd_2O_3$ | 32.81 g |
| $CaCO_3$ | 631.00 g |
| $TiO_2$ | 519.00 g |
| LiF | 16.86 g |

X ray diffractiometry gave only the pattern of $CaTiO_3$. The mean particle size was about 1 μm.

EXAMPLE 3

A fluorescent substance was prepared by repeating Example 1, except that the amount of LiF was altered from 16.86 g to 168.6 g. X ray diffractiometry gave only the pattern of $CaTiO_3$. The mean particle size was about 2 μm.

COMPARATIVE EXAMPLE 1

The following starting materials:

| | |
|---|---|
| $Nd_2O_3$ | 30 g |
| $Yb_2O_3$ | 4 g |
| $Li_2CO_3$ | 11 g |
| $(NH_4)H_2PO_4$ | 140 g | were thoroughly mixed together, introduced into an alumina crucible and fired at 700° C. for 2 hours. After the firing, the fired mixture was washed with 1N nitric acid, washed with water and dried. The fluorescent substance thus obtained was identified as $LiNdYbP_4O_{12}$ based on the X ray diffraction pattern. The mean particle size was about 7 μm.

COMPARATIVE EXAMPLE 2

A fluorescent substance was prepared by repeating Comparative Example 1, except that the following starting materials:

| | |
|---|---|
| $Nd_2O_3$ | 30 g |
| $Li_2CO_3$ | 11 g |
| $(NH_4)H_2PO_4$ | 140 g | were used and $Yb_2O_3$ was not added. The particle size was about 7 μm.

Figure 1:
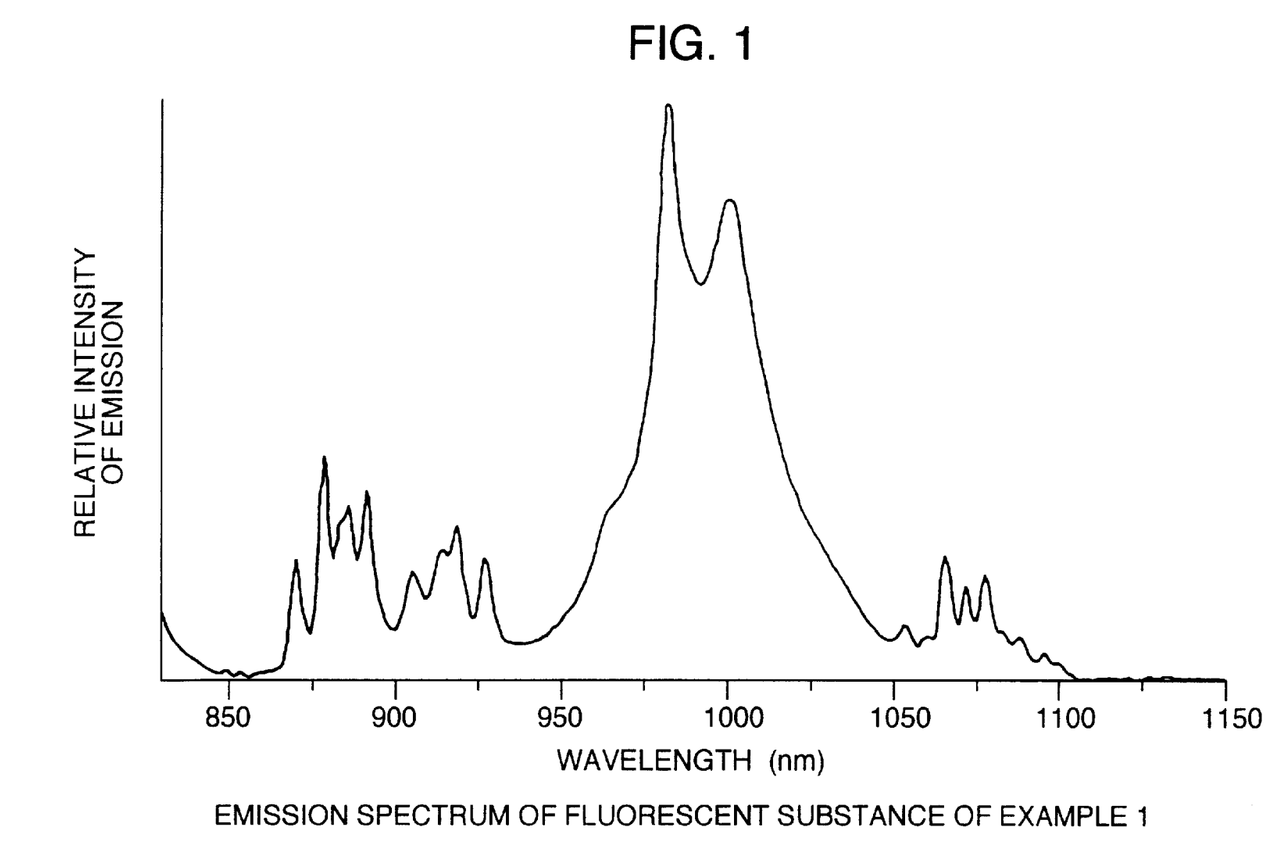
FIG. 1 is a wave form diagram illustrating the emission spectrum of the fluorescent substance obtained in Example 1.
Figure 2:
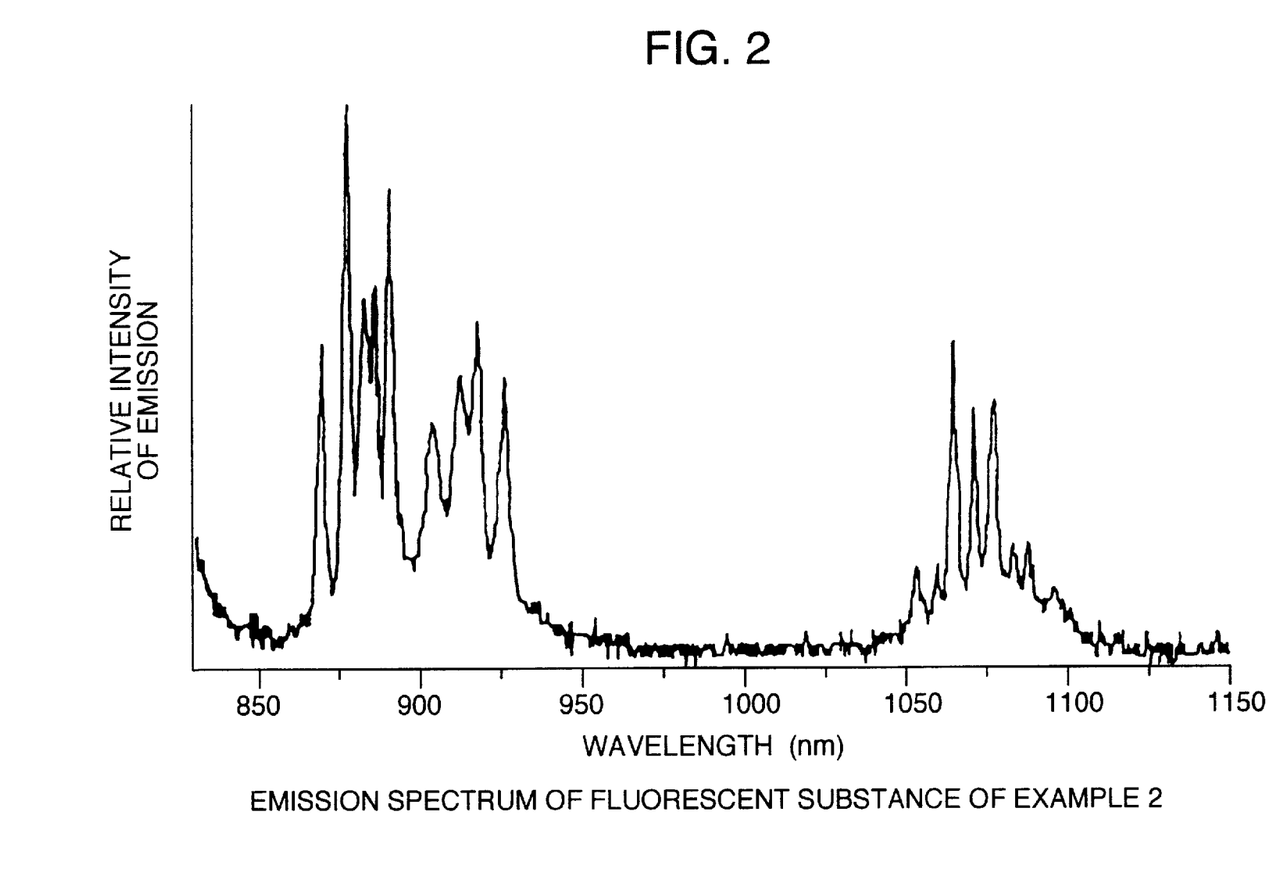
FIG. 2 is a wave form diagram illustrating the emission spectrum of the fluorescent substance obtained in Example 2.

FIG. 1 and FIG. 2 are emission spectra of the fluorescent substances obtained in Example 1 and Example 2, respectively, measured by using a semiconductor laser having a wavelength of 810 nm. In FIG. 1 illustrating the spectrum of the fluorescent substance obtained in Example 1, emissions due to Nd were observed at 850–930 nm and 1050–1110 nm, and a broad emission due to Yb was observed at 980 nm. In FIG. 2 illustrating the spectrum of fluorescent substance obtained in Example 2, only an emission due to Nd was observed.

Light emission intensities of the fluorescent substances obtained in Examples 1–3 and Comparative Examples 1–2 were measured. Since the fluorescent substances obtained in Comparative Examples 1 and 2 had a mean particle size of 7 μm and they could not be printed because of large particle size, they were mechanically pulverized to decrease the particle size to 1.5 μm. When the fluorescent substance was powdery, light emission intensity was measured on both powder and printed product.

TABLE 1

| | Light emission intensity (powder) | Light emission intensity (printed product) |
|---|---|---|
| Example 1 | 100 | 100 |
| Example 2 | 60 | 60 |
| Example 3 | 110 | 110 |
| Comparative Example 1 | 175 | 70 |
| Comparative Example 2 | 90 | 40 |

It is apparent from Table 1 that the fluorescent substance of the present invention shows the same intensity of light emission whether it is used in the state of powder or blended into ink components and used as a printed matter. Contrariwise, the fluorescent substances of the Comparative Examples show a marked decrease in the intensity of light emission when used as a printed product.

EXAMPLE 4

The following starting materials:

| | |
|---|---|
| $Nd_2O_3$ | 1.9 g |
| $Yb_2O_3$ | 8.7 g |
| $CaCO_3$ | 49.5 g |
| $TiO_2$ | 43.9 g |
| NaF | 2.3 g | were thoroughly mixed together, transferred into an alumina crucible and fired at 1,150° C. for 1.5 hours in the atmospheric air. After firing, the mixture was washed with hydrochloric acid, washed with water and dried to obtain a particulate product having a mean particle size of about 3.0 μm. X ray diffractiometry gave only a diffraction pattern of $Yb_2Ti_2O_7$ in addition to that of $CaTiO_3$.

EXAMPLE 5

A fluorescent substance was prepared by repeating Example 1, except that NaF was replaced with the following component:

| | |
|---|---|
| LiF | 1.4 g. |

A particulate material having a mean particle size of about 3.0 μm was obtained. X ray diffractiometry gave a diffraction pattern of $Yb_2Ti_2O_7$ in addition to that of $CaTiO_3$.

EXAMPLE 6

A fluorescent substance was prepared by repeating Example 5, except that $CaCO_3$ was replaced with the following component:

| | |
|---|---|
| $SrCO_3$ | 75.8 g |

As a result, a particulate material having a mean particle size of about 5.0 μm was obtained. X ray diffractiometry gave a diffraction pattern of $Yb_2Ti_2O_7$ in addition that of $SrTiO_3$.

EXAMPLE 7

A fluorescent substance was prepared by repeating Example 5, except that $CaCO_3$ was replaced with the following component:

| | |
|---|---|
| $BaCO_3$ | 98.7 g |

As a result, a particulate material having a mean particle size of about 5.0 μm was obtained. X ray diffractiometry gave a diffraction pattern of $Yb_2Ti_2O_7$ in addition to that of $BaTiO_3$.

EXAMPLE 8

A fluorescent substance was prepared by repeating Example 5, except that the following component:

| | |
|---|---|
| $Al_2O_3$ | 2.8 g | was additionally added. As a result, a particulate material having a mean particle size of about 2.0 μm was obtained. X ray diffractiometry gave only a diffraction pattern of $CaTiO_3$.

EXAMPLE 9

A fluorescent substance was prepared by repeating Example 8, except that LiF was substituted with the following component:

| | |
|---|---|
| $Na_2CO_3$ | 5.7 g | and the quantity of Nd was altered from 1.9 g to 0.9 g. As a result, a particulate material having a mean particle size of about 4.0 μm was obtained. X ray diffractiometry gave only a pattern of $CaTiO_3$.

EXAMPLE 10

A fluorescent substance was prepared by repeating Example 8, except that LiF was replaced with the following component:

| | |
|---|---|
| KF | 8.7 g | and the quantity of Yb was altered from 8.7 g to 4.1 g. As a result, a fluorescent substance having a mean particle size of about 1.0 μm was obtained. X ray diffractiometry gave only a pattern of $CaTiO_3$.

EXAMPLE 11

A fluorescent substance was prepared by repeating Example 10, except that KF was replaced with the following component:

| | |
|---|---|
| LiF | 4.3 g | and 2.5 g of $Y_2O_3$ was additionally added. As a result, a fluorescent substance having a mean particle size of about 1.5 μm was obtained. X ray diffractiometry gave only a pattern of $CaTiO_3$.

EXAMPLE 12

A fluorescent substance was prepared by repeating Example 11, except that $Y_2O_3$ was replaced with the following component:

| | |
|---|---|
| $La_2O_3$ | 3.6 g |

As a result, a particulate material having a particle size of about 2.0 μm was obtained. X ray diffractiometry gave only a pattern of $CaTiO_3$.

EXAMPLE 13

A fluorescent substance was prepared by repeating Example 11, except that $Y_2O_3$ was replaced with the following component:

| | |
|---|---|
| $Gd_2O_3$ | 4.0 g |

As a result, a particulate material having a mean particle size of about 1.5 μm was obtained. X ray diffractiometry gave only a pattern of $CaTiO_3$.

EXAMPLE 14

A fluorescent substance was prepared by repeating Example 11, except that $Y_2O_3$ was replaced with the following component:

| | |
|---|---|
| $Bi_2O_3$ | 5.1 g | as a result, a particulate material having a mean particle size of about 1.5 μm was obtained. X ray diffractiometry gave only a pattern of $CaTiO_3$.

EXAMPLE 15

A fluorescent substance was prepared by repeating Example 13, except that $Al_2O_3$ was replaced with the following component:

| | |
|---|---|
| $Ga_2O_3$ | 9.0 g | and the quantity of $Gd_2O_3$ was altered from 4.0 g to 11.7 g. As a result, a particulate material having a mean particle size of about 1.0 μm was obtained. X ray diffractiometry gave only a pattern of $CaTiO_3$.

COMPARATIVE EXAMPLE 3

A fluorescent substance was prepared by repeating Comparative Example 1, except that the fluorescent substance obtained in Comparative Example 1 was mechanically pulverized to reduce the mean particle size to about 1.5 μm.

COMPARATIVE EXAMPLE 4

A fluorescent substance was prepared by repeating Comparative Example 2, except that the fluorescent substance obtained in Comparative Example 2 was mechanically pulverized to reduce the mean particle size to about 1.5 μm.

Table 2 lists the light emission characteristics and mean particle sizes of the fluorescent substances obtained in Examples 4–15 and Comparative Examples 1–4. For evaluating light emission characteristics of the fluorescent substances, a fluorescent substance was excited with a light source having a wavelength of 810 nm and the intensity of light emitted at 980 nm was measured with a silicon detector. Intensity of light emission was expressed by taking the value of the sample of Example 4 as 100.

TABLE 2

|  | Relative intensity of light emission | Mean particle size (μm) |
|---|---|---|
| Example 4 | 100 | 3.0 |
| Example 5 | 100 | 3.0 |
| Example 6 | 100 | 5.0 |
| Example 7 | 110 | 5.0 |
| Example 8 | 180 | 2.0 |
| Example 9 | 150 | 4.0 |
| Example 10 | 180 | 1.0 |
| Example 11 | 200 | 1.5 |
| Example 12 | 190 | 2.0 |
| Example 13 | 160 | 1.5 |
| Example 14 | 190 | 1.5 |
| Example 15 | 140 | 1.0 |
| Comparative Example 1 | 150 | 7.0 |
| Comparative Example 2 | 60 | 7.0 |
| Comparative Example 3 | 50 | 1.5 |
| Comparative Example 4 | 20 | 1.5 |

It is apparent from Table 2 that, according to the present invention, an infrared emitting fluorescent substance having a mean particle size of 2 μm or less and giving a higher intensity of emission than prior ones can be obtained.

Figure 3:
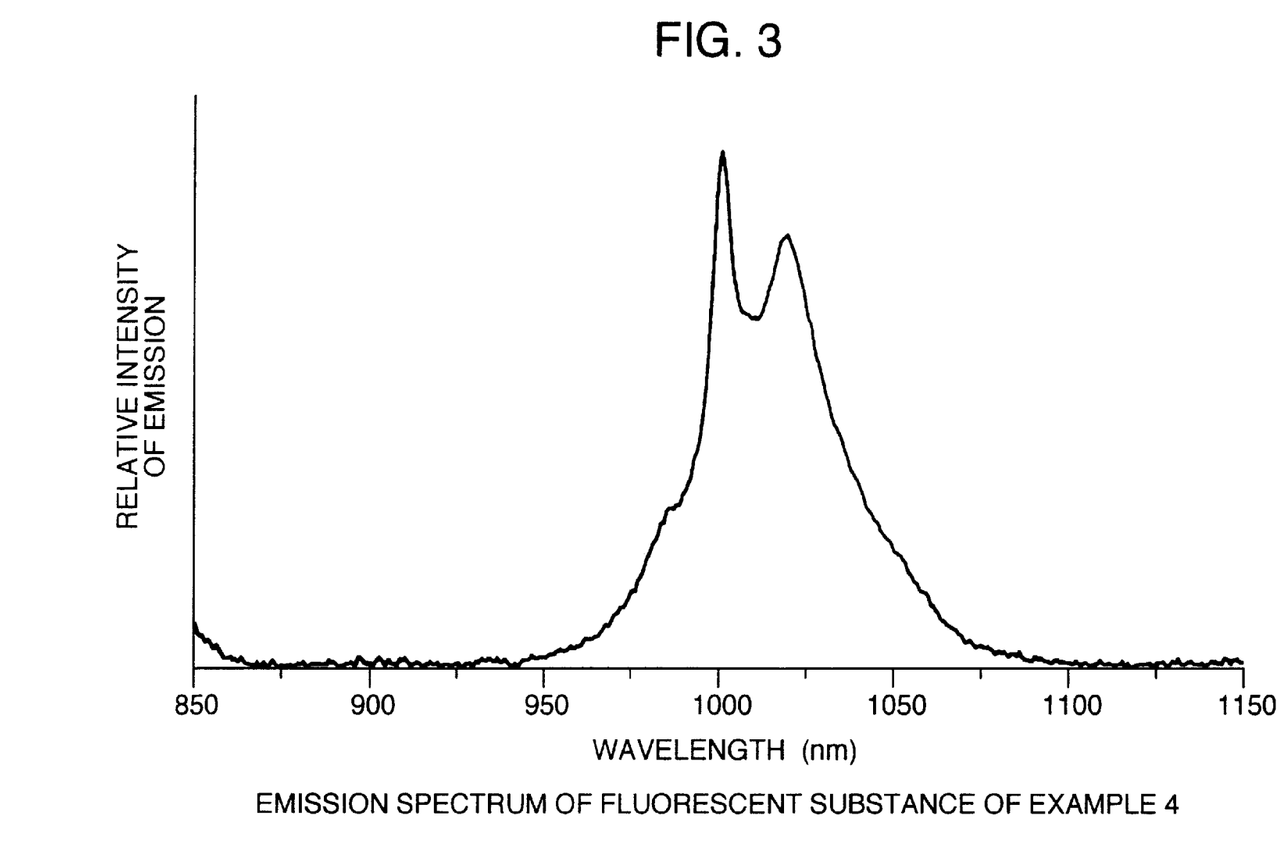
FIG. 3 is a wave form diagram illustrating the emission spectrum of the fluorescent substance obtained in Example 4.
Figure 4:
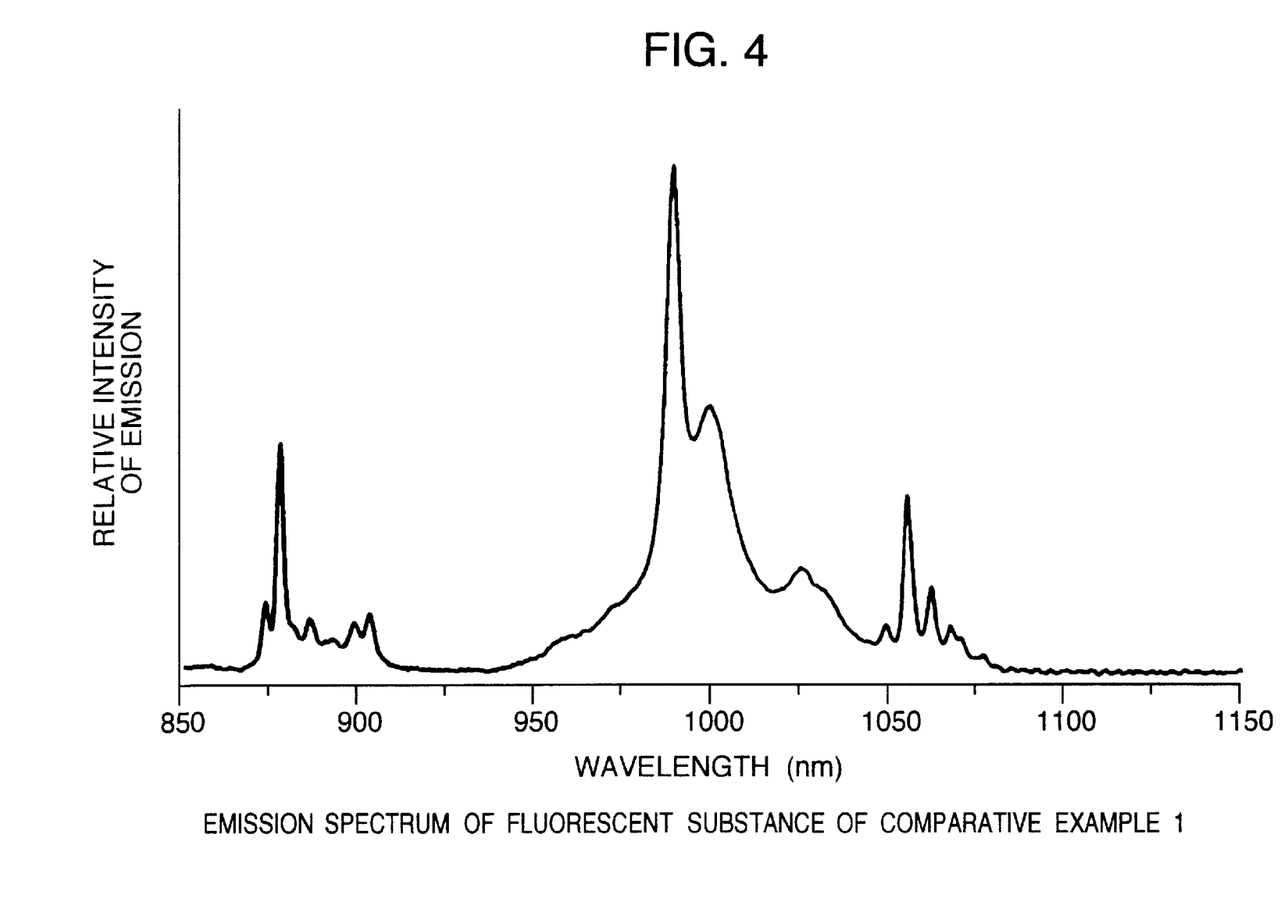
FIG. 4 is a wave form diagram illustrating the emission spectrum of the fluorescent substance obtained in Comparative Example 1.

FIGS. 3 and 4 illustrate the emission spectra of the fluorescent substances obtained in Example 4 and Comparative Example 1, respectively. These spectra were measured with a semiconductor laser of 810 nm. In FIG. 3, only the broad emission peak around 980 nm due to Yb was observed. In FIG. 4, the peaks of 850–930 nm and 1050–1110 nm due to Nd and the broad peak of 980 nm due to Yb were observed. It is understandable from comparison of the spectra shown in FIGS. 3 and 4 that the infrared emitting fluorescent substance of the present invention is a novel infrared emitting fluorescent substance entirely different in characteristics from the infrared emitting fluorescent substance of Comparative Example 1. Further, the peak in the emission spectrum of Example 4 is positioned at about 1000 nm, which coincides with the position of wavelength at which silicon detector exhibits the highest ability of detection. Accordingly, the efficiency of detection is high, and the apparent intensity of light emission is also high.

EXAMPLE 16

The following starting materials:

| | |
|---|---|
| 1 mole/liter aqueous solution of $NdCl_3$ | 14.2 g |
| 1 mole/liter aqueous solution of $YbCl_3$ | 14.2 g |
| $CaCl_2$ | 105.8 g |
| $AlCl_3$ | 19.3 g | were thoroughly dissolved in one liter of pure water and the resulting solution was dropwise added to 4 liters of a 2 moles/liter solution of oxalic acid in which 57.5 g of $TiO_2$ had previously been dispersed. The resulting precipitate was dried, mixed with 2.1 g of LiF, charged into an alumina crucible and fired at 1,150° C. for 1.5 hours in the atmospheric air. After the firing, the fired material was washed with hydrochloric acid and then with water and dried. X ray diffractiometry gave only the pattern of $CaTiO_3$. Thus, there was obtained a particulate product having a mean particle size of about 1.0 μm.

EXAMPLE 17

The following powdery starting materials:

| | |
|---|---|
| $NdCl_3$ hexahydrate | 2.0 g |
| $YbCl_3$ hexahydrate | 4.2 g |
| $CaCl_2$ hexahydrate | 37.9 g | were thoroughly dissolved in one liter of pure water and the resulting solution was dropwise added to 4 liters of a 1 mole/liter solution of oxalic acid in which 20.6 g of $TiO_2$ and 0.8 g of $Al_2O_3$ had previously been dispersed. The resulting precipitate was dried, mixed with 1.4 g of LiF, charged into an alumina crucible, and fired at 1,150° C. for 1.5 hours in the atmospheric air. After the firing, the fired material was washed with hydrochloric acid and then with water, and dried. X ray diffractiometry gave only the pattern of $CaTiO_3$. The mean particle size was about 1.0 μm.

EXAMPLE 18

The following powdery starting materials:

| | |
|---|---|
| $NdCl_3$ hexahydrate | 6.6 g |
| $YbCl_3$ hexahydrate | 14.3 g | were thoroughly dissolved in 1 liter of pure water and the resulting solution was dropwise added to 4 liters of a 0.06 mole/liter solution of oxalic acid in which 69.3 g of $TiO_2$, 0.8 g of $Al_2O_3$ and 86.8 g of $CaCO_3$ had previously been dispersed. The resulting precipitate was dried, mixed with 2.4 g of Lif, charged into an alumina crucible, and fired at 1,150° C. for 1.5 hours in the atmospheric air. After the firing, the fired material was washed with hydrochloric acid and then with water, and dried. X ray diffractiometry gave only pattern of $CaTiO_3$. Thus, a particulate product having a mean particle size of about 2.0 μm was obtained.

Table 3 summarizes the light emission characteristics, mean particle sizes and the percentages occupied by particles having a particle size of 5 μm or above of the fluorescent substances obtained in Examples 16–18, Example 5 and Example 8. The light emission characteristics were evaluated by exciting a sample with a light source of 810 nm and measuring the intensity of light emission at 980 m by means of a silicon detector. The intensities of light emission are expressed by taking the value of the sample of Example 16 as 100.

TABLE 3

|  | Relative intensity of light emission | Mean particle size (μm) | Percentage of particles having a particle size of 5 μm or above (%) |
|---|---|---|---|
| Example 16 | 100 | 1.0 | 0 |
| Example 17 | 110 | 1.0 | 0 |
| Example 18 | 120 | 2.0 | 5.0 |
| Example 5 | 60 | 3.0 | 20.0 |
| Example 8 | 90 | 2.0 | 10.0 |

It is apparent from Table 3 that, according to the process of Examples 16–18 forming a water-insoluble precipitate, there can be obtained an infrared-emitting fluorescent substance smaller in mean particle size, sharper in the particle size distribution and higher in the intensity of light emission than the products obtained in Examples 5 and 8 where a different process was adopted.

Figure 5:
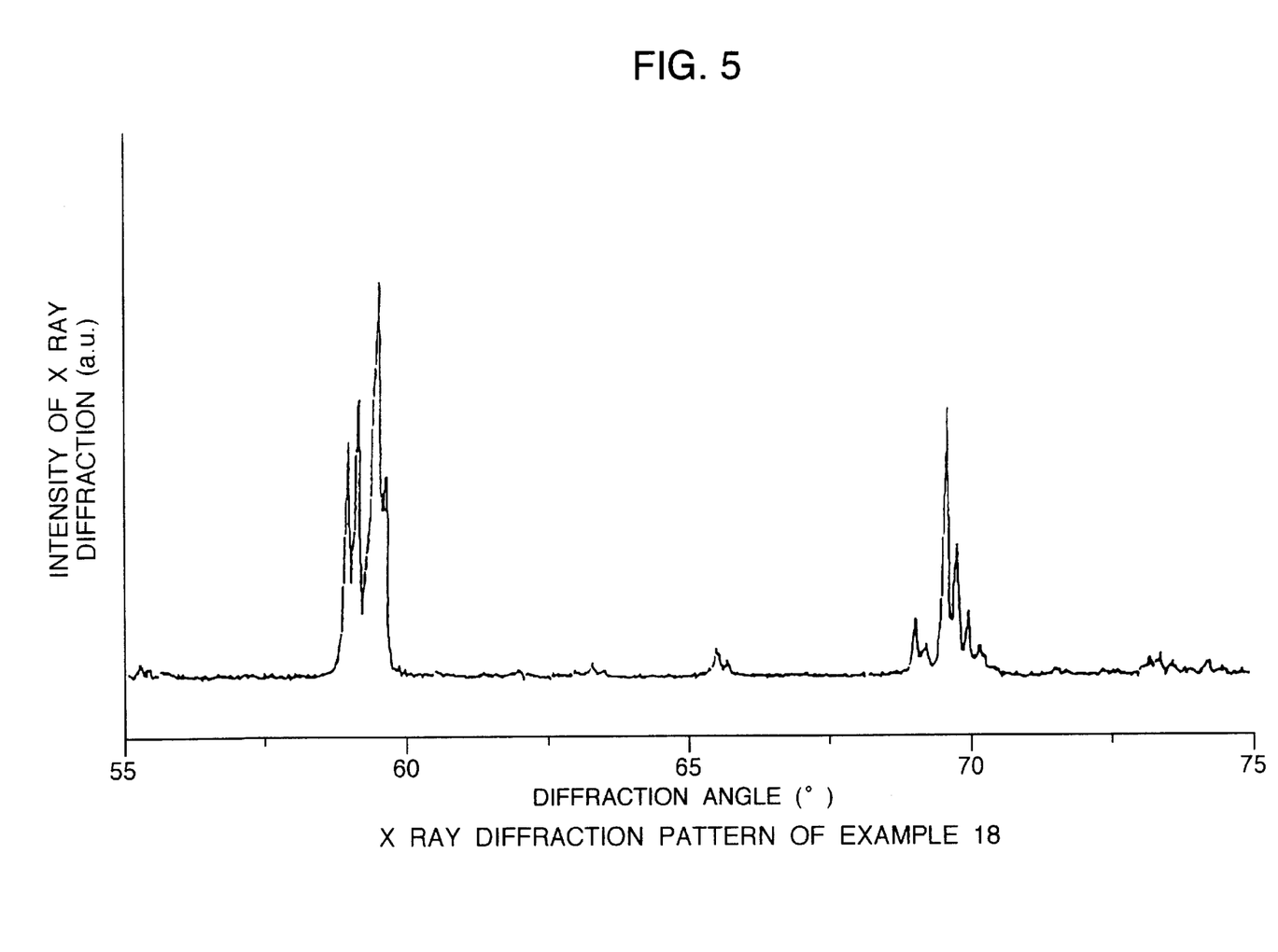
FIG. 5 is a wave form diagram illustrating the X ray diffraction pattern of the fluorescent substance obtained in Example 18.
Figure 6:
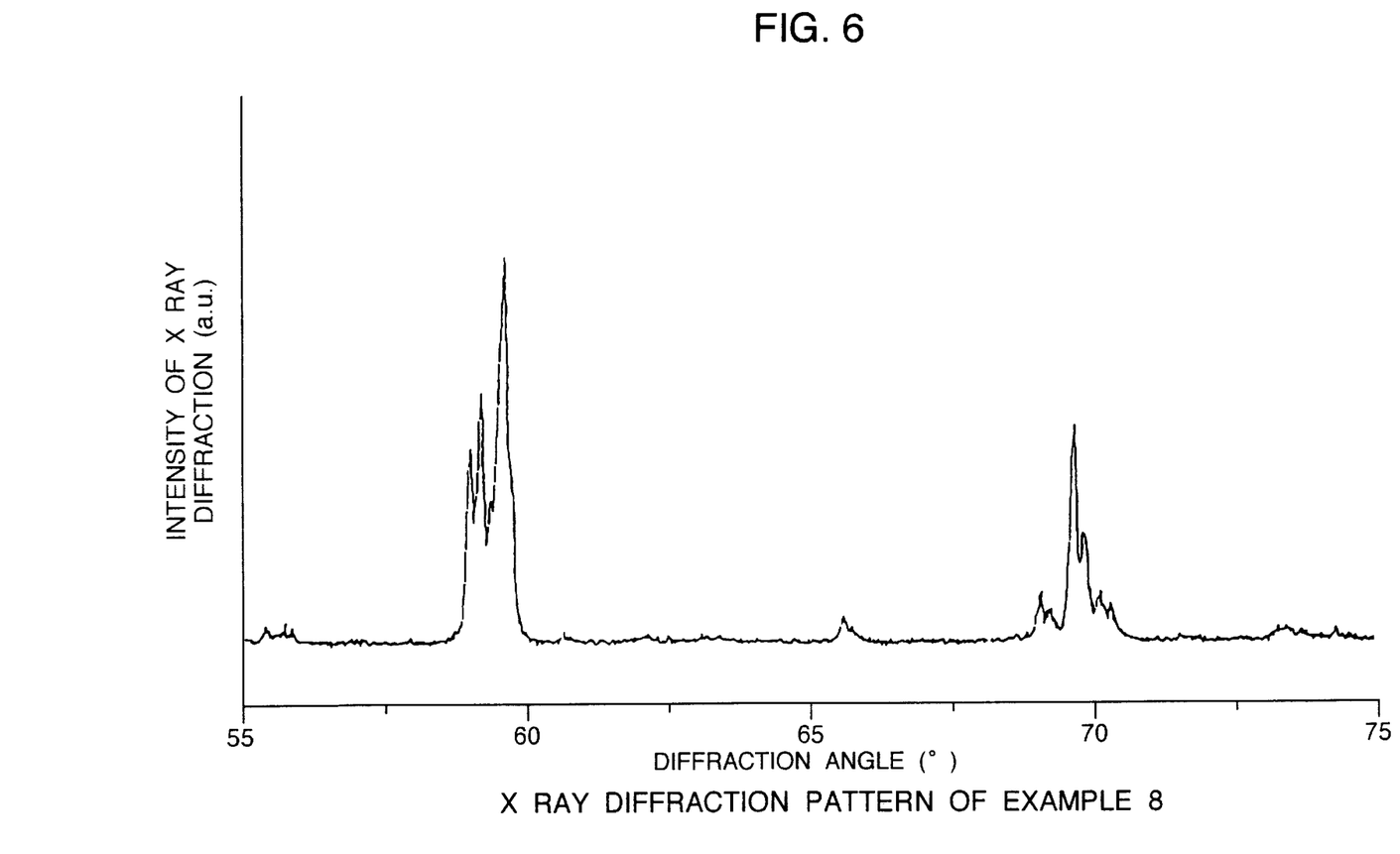
FIG. 6 is a wave form diagram illustrating the X ray diffraction pattern of the fluorescent substance obtained in Example 8.

FIGS. 5 and 6 illustrate the X ray diffraction wave form diagrams of the fluorescent substances obtained in Example 18 and Example 8, respectively. In FIG. 5 the half value widths of diffraction peaks were narrow, while in FIG. 6 broad diffraction peaks were observed. It is understandable from comparison of the X ray diffraction wave form diagrams shown in FIGS. 5 and 6 that the infrared emitting fluorescent substance obtained in Example 16 is much improved in crystallinity as compared with the infrared emitting fluorescent substance obtained in Example 5.

The present invention, in part, is drawn to a process for producing an infrared fluorescent substance represented by the following general formula:

ATiO$_3$:X,Y,Z wherein A is at least one element selected from the group consisting of Ca, Sr and Ba, X is at least one element selected from the group consisting of Nd and Yb, Y is at least one element selected from the group consisting of Al, Ga and In and Z is at least one element selected from the group consisting of Sc, Y, Gd, Bi, Lu and La, which comprises using water-soluble salts as a compound of said at least one element selected from the group consisting of Ca, Sr and Ba, a compound of said at least one element selected from the group consisting of Nd and Yb, a compound of said at least one element selected from the group consisting of Al, Ga and In and a compound of said at least one element selected from the group consisting of Sc, Y, Gd, Bi, Lu and La, dissolving said water-soluble salts in water to prepare an aqueous solution, co-precipitating said elements in the form of hydroxide, oxalate or carbonate together with titanium dioxide, and firing the resulting precipitate.

The inventive process further comprises using a water-insoluble compound as at least one of the compounds of the elements represented by A, X, Y and Z, mixing said water-insoluble compound into the aqueous solution containing the water-soluble compounds of the other elements, co-precipitating the elements in the form of oxide, oxalate or carbonate together with titanium dioxide, and firing the resulting precipitate.

In a preferred embodiment, the water-insoluble compound is an oxide.

EXAMPLE 19

The following starting materials:

| Nd$_2$O$_3$ | 5.4 g |
|---|---|
| Yb$_2$O$_3$ | 25.2 g |
| CaCO$_3$ | 144.1 g |
| ZrO$_2$ | 177.4 g |
| LiF | 12.5 g | were thoroughly mixed together, transferred into an alumina crucible, and fired at 1,300° C. for 1.5 hours in the atmospheric air. After the firing, the fired material was washed with hydrochloric acid and then with water, and dried. Thus, a particulate material having a mean particle size of about 5.0 μm was obtained. X ray diffractiometry of the fluorescent substance thus obtained showed only the diffraction pattern of CaZrO$_3$.

EXAMPLE 20

A fluorescent substance was prepared by repeating Example 19, except that the following component:

| Al$_2$O$_3$ | 8.2 g |
|---|---| was additionally added. As a result, a particulate material having a mean particle size of about 4.0 μm was obtained. X ray diffractiometry gave only the pattern of CaZrO$_3$.

Table 4 summarizes the light emission characteristics and mean particle diameters of the fluorescent substances obtained in Examples 19 and 20 and Comparative Examples 1 and 2. The light emission characteristics of fluorescent substances were evaluated by exciting a fluorescent substance with a light source of 810 nm and measuring intensity of the emitted light at 980 nm with a silicon detector. The intensities of light emission are expressed by taking the value of the sample of Example 19 as 100.

TABLE 4

| Sample | Relative intensity of light emission | Mean particle size (μm) |
|---|---|---|
| Example 19 | 100 | 5.0 |
| Example 20 | 100 | 4.0 |
| Comparative Example 1 | 80 | 7.0 |
| Comparative Example 2 | 40 | 7.0 |

It is apparent from Table 4 that the zirconate type fluorescent substance of the present invention has a mean particle size of 5 μm or less, and the intensity of light emission is much higher than that of prior fluorescent substances.

Figure 7:
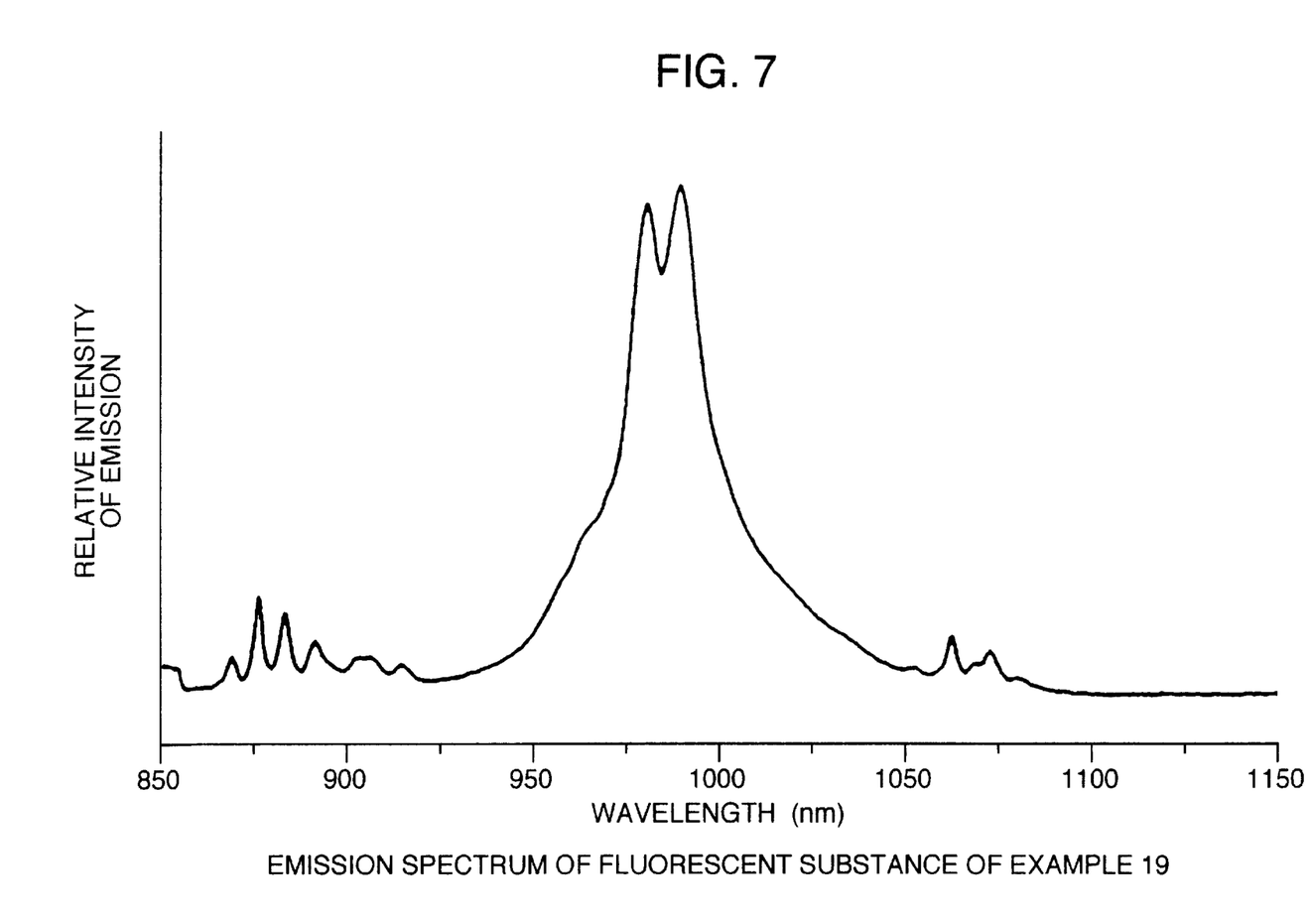
FIG. 7 is a wave form diagram illustrating the emission spectrum of the fluorescent substance obtained in Example 19.

FIG. 7 illustrates the emission spectrum of the fluorescent substance obtained in Example 19. The emission spectrum of the fluorescent substance obtained in Comparative Example 1 is as shown in FIG. 4. These emission spectra were measured with a semiconductor laser of 810 nm. It is understandable from comparison of the emission spectra shown in FIGS. 7 and 4 that the infrared emitting fluorescent substance of the present invention is a novel infrared emitting fluorescent substance entirely different in characteristics from that of Comparative Example 1. Further, the peak in the emission spectrum of Example 19 is positioned at about 1000 nm, which coincides with the position of wavelength where a silicon type detector exhibits the highest ability of detection. Accordingly, the efficiency of detection is high, and the apparent intensity of light emission is also high.

EXAMPLE 21

The following starting materials:

| | |
|---|---|
| $Nd_2O_3$ | 6.7 g |
| $Yb_2O_3$ | 12.6 g |
| $CaCO_3$ | 69.7 g |
| $TiO_2$ | 127.8 g |
| $ZrO_2$ | 98.6 g |
| LiF | 6.2 g | were thoroughly mixed together, transferred into an alumina crucible, and fired at 1,150° C. for 1.5 hours in the atmospheric air. After the firing, the fired material was washed with hydrochloric acid and then with water, and dried. Thus, a particulate material having a mean particle size of 3.0 μm was obtained. X ray diffractiometry gave only the diffraction pattern of $CaZrTi_2O_7$.

EXAMPLE 22

A fluorescent substance was prepared by repeating Example 21, except that the following component:

| | |
|---|---|
| $Al_2O_3$ | 4.3 g | was additionally added. As a result, a particulate material having a mean particulate size of 3.0 μm was obtained. X ray diffractiometry gave only the pattern of $CaZrTi_2O_7$.

EXAMPLE 23

A fluorescent substance was prepared by repeating Example 21, except that LiF was replaced with the following component:

| | |
|---|---|
| NaF | 11.4 g |

As a result, a particulate material having a mean particle size of about 2.0 μm was obtained. X ray diffractiometry gave only the diffraction pattern of $CaZrTi_2O_7$.

EXAMPLE 24

A fluorescent substance was prepared by repeating Example 21, except that LiF was replaced with the following component:

| | |
|---|---|
| KF | 15.7 g |

As a result, a particulate material having a mean particle size of about 2.0 μm was obtained. X ray diffractiometry gave only the diffraction pattern of $CaZrTi_2O_7$.

EXAMPLE 25

A fluorescent substance was prepared by repeating Example 22, except that the following component was added additionally:

| | |
|---|---|
| $Y_2O_3$ | 2.5 g |

As a result, a particulate material having a mean particle size of 2.0 μm was obtained. X ray diffractiometry gave only the diffraction pattern of $CaZrTi_2O_7$.

Table 5 summarizes light emission characteristics and mean particle sizes of the fluorescent substances obtained in Examples 21–25 and Comparative Examples 1–4. Light emission characteristics of fluorescent substances were evaluated by exciting a sample with a light source of 810 nm and measuring the intensity of light emission by means of a silicon type detector at 980 nm. The intensities of light emission are expressed by taking the value of the sample of Example 21 as 100.

TABLE 5

| | Relative intensity of light emission | Mean particle size (μm) |
|---|---|---|
| Example 21 | 180 | 3.0 |
| Example 22 | 130 | 3.0 |
| Example 23 | 100 | 2.0 |
| Example 24 | 110 | 1.0 |
| Example 25 | 120 | 2.0 |
| Comparative Example 1 | 150 | 7.0 |
| Comparative Example 2 | 60 | 7.0 |
| Comparative Example 3 | 50 | 1.5 |
| Comparative Example 4 | 20 | 1.5 |

It is apparent from Table 5 that, according to the present invention, an infrared emitting fluorescent substance having a mean particle size of 3 μm or less and having a higher intensity of light emission than prior fluorescent substances can be obtained.

Figure 8:
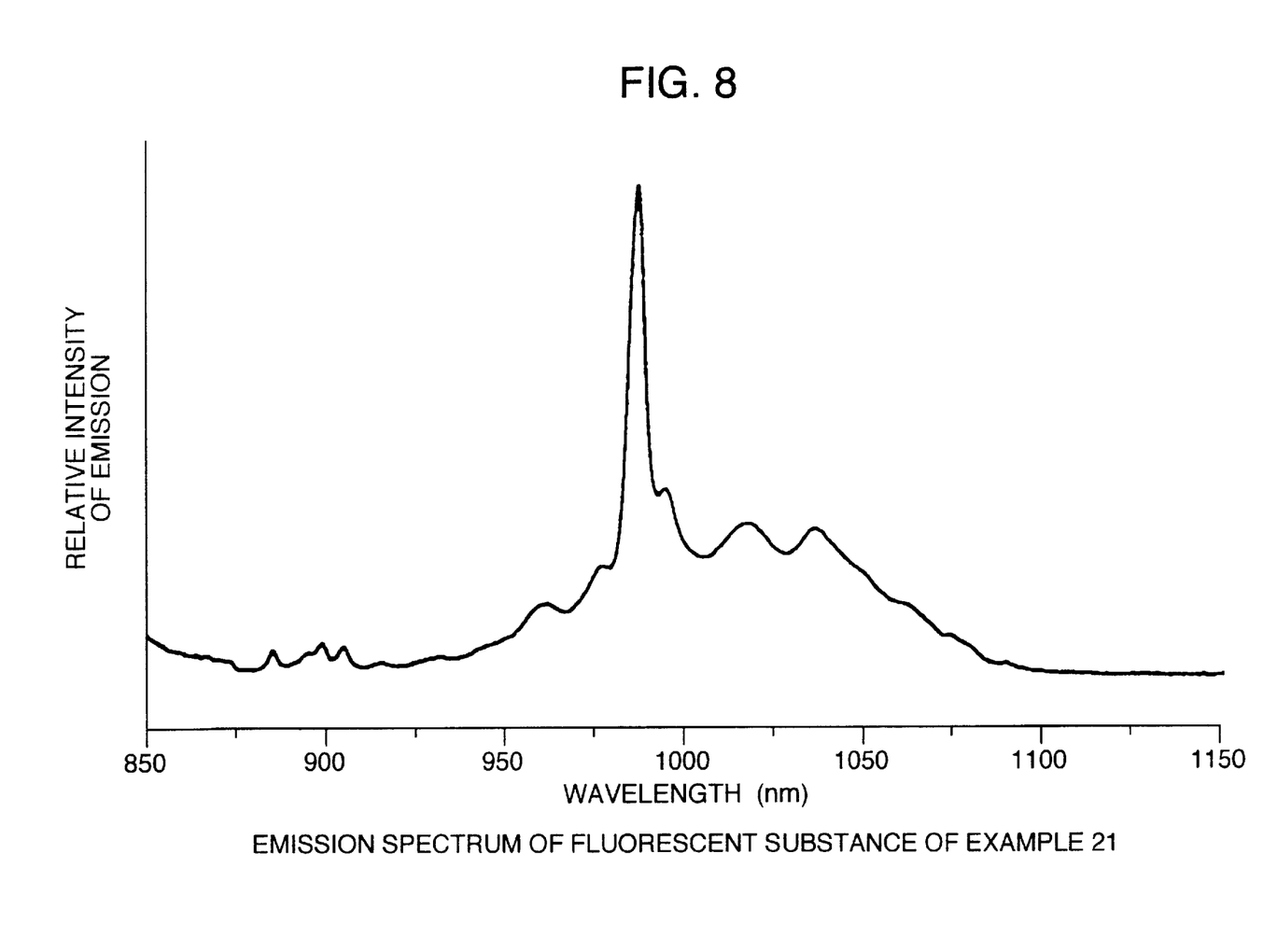
FIG. 8 is a wave form diagram illustrating the emission spectrum of the fluorescent substance obtained in Example 21.

FIG. 8 illustrates the emission spectrum of the fluorescent substance obtained in Example 21. The emission spectrum was measured with a semiconductor laser of 810 nm. In FIG. 8, only a broad emission spectrum due to Yb is observed at about 980 nm. It is understandable from comparison of the emission spectra of FIGS. 8 and 4 that the infrared emitting fluorescent substance of the present invention is a novel infrared emitting fluorescent substance entirely different in characteristics from that of Comparative Example 1. In the emission spectrum of Example 21, the peak is positioned at about 1000 nm, which coincides with the position of wavelength where a silicon type detector exhibits the highest ability of detection. Accordingly, the efficiency of detection is high, and the apparent intensity of light emission is also high.

As described above, a fluorescent substance for Stellus type bar code can be obtained according to the present invention.

What is claimed is:

1. A fluorescent substance represented by the following general formula:

wherein A is at least one element selected from the group consisting of Ca, Sr and Ba, Q is Ti or Zr, X is at least one element selected from the group consisting of Nd and Yb, and Y is at least one element selected from the group consisting of Al, Ga and In.

2. A fluorescent substance represented by the following general formula:

$$AQO_3:X,Y,Z$$

wherein A is at least one element selected from the group consisting of Ca, Sr and Ba, Q is Ti or Zr, X is at least one element selected from the group consisting of Nd and Yb, Y is at least one element selected from the group consisting of Al, Ga and In, and Z is at least one element selected from the group consisting of Sc, Y, Gd, Bi, Lu and La.

3. A fluorescent substance represented by the following general formula:

$$AZrTi_2O_7:X$$

wherein A is at least one element selected from the group consisting of Ca, Sr and Ba, and X is at least one element selected from the group consisting of Nd and Yb.

4. A fluorescent substance represented by the following general formula:

$$AZrTi_2O_7:X,Y$$

wherein A is at least one element selected from the group consisting of Ca, Sr and Ba, X is at least one element selected from the group consisting of Nd and Yb, and Y is at least one element selected from the group consisting of Al, Ga and In.

5. A fluorescent substance represented by the following general formula:

$$AZrTi_2O_7:X,Y,Z$$

wherein A is at least one element selected from the group consisting of Ca, Sr and Ba, X is at least one element selected from the group consisting of Nd and Yb, Y is at least one element selected from the group consisting of Al, Ga and In, and Z is at least one element selected from the group consisting of Sc, Y, Gd, Bi, Lu and La.

6. A process for producing a fluorescent substance represented by the following general formula:

$$ATiO_3:X$$

wherein A is at least one element selected from the group consisting of Ca, Sr and Ba and X is at least one element selected from the group consisting of Nd and Yb, which comprises using water-soluble salts as a compound of said at least one element selected from the group consisting of Ca, Sr and Ba and a compound of said at least one element selected from the group consisting of Nd and Yb, dissolving said water-soluble salts in water to prepare an aqueous solution, co-precipitating said elements in the form of hydroxide, oxalate or carbonate together with titanium dioxide, and firing the resulting precipitate.

7. A process for producing a fluorescent substance represented by the following general formula:

$$ATiO_3:X,Y$$

wherein A is at least one element selected from the group consisting of Ca, Sr and Ba, X is at least one element selected from the group consisting of Nd and Yb and Y is at least one element selected from the group consisting of Al, Ga and In, which comprises using water-soluble salts as a compound of said at least one element selected from the group consisting of Ca, Sr and Ba, a compound of said at least one element selected from the group consisting of Nd and Yb and a compound of said at least one element selected from the group consisting of Al, Ga and In, dissolving said water-soluble salts in water to prepare an aqueous solution, co-precipitating said elements in the form of hydroxide, oxalate or carbonate together with titanium dioxide, and firing the resulting precipitate.

8. A process for producing a fluorescent substance represented by the following general formula:

$$ATiO_3:X,Y,Z$$

wherein A is at least one element selected from the group consisting of Ca, Sr and Ba, X is at least one element selected from the group consisting of Nd and Yb, Y is at least one element selected from the group consisting of Al, Ga and In and Z is at least one element selected from the group consisting of Sc, Y, Gd, Bi, Lu and La, which comprises using water-soluble salts as a compound of said at least one element selected from the group consisting of Ca, Sr and Ba, a compound of said at least one element selected from the group consisting of Nd and Yb, a compound of said at least one element selected from the group consisting of Al, Ga and In and a compound of said at least one element selected from the group consisting of Sc, Y, Gd, Bi, Lu and La, dissolving said water-soluble salts in water to prepare an aqueous solution, co-precipitating said elements in the form of hydroxide, oxalate or carbonate together with titanium dioxide, and firing the resulting precipitate.

9. A process for producing a fluorescent substance according to claim 6, 7 or 8, which comprises using a water-insoluble compound an oxide as at least one of the compounds of the elements represented by A, X, Y and Z, mixing said water-insoluble compound into the aqueous solution containing the water-soluble compounds of the other elements, co-precipitating the elements in the form of dioxide, oxalate or carbonate together with titanium oxide, and firing the resulting precipitate.

10. The process for producing a fluorescent substance according to claim 9, wherein the water-insoluble compound is an oxide.

11. A fluorescent substance represented by the following general formula:

$$AQO_3:X$$

wherein A is at least one element selected from the group consisting of Ca, Sr and Ba, Q is Ti or Zr, and X is at least one element selected from the group consisting of Nd and Yb; and has a mean particle size of 5 μm or less.

12. A fluorescent substance represented by the following general formula:

$$AQO_3:X$$

wherein A is at least one element selected from the group consisting of Ca, Sr and Ba, Q is Ti or Zr, and X is at least one element selected from the group consisting of Nd and Yb; wherein the fluorescent substance is not $CaZrO_3$:Nd, $BaTiO_3$:Nd or $SrTiO_3$:Nd.

13. A fluorescent substance represented by the following general formula:

$AQO_3$:X wherein A is at least one element selected from the group consisting of Ca, Sr and Ba, Q is Ti or Zr, and X is at least one element selected from the group consisting of Nd and Yb; wherein when the fluorescent substance is $CaZrO_3$:Nd, $BaTiO_3$:Nd or $SrTiO_3$:Nd, then the fluorescent substance also contains Yb.

14. A fluorescent substance represented by the following general formula:

$AQO_3$:X wherein A is at least one element selected from the group consisting of Ca, Sr and Ba, Q is Ti or Zr, and X is Nd and Yb.

* * * * *